(12) United States Patent
Narayan et al.

(10) Patent No.: US 7,934,215 B2
(45) Date of Patent: Apr. 26, 2011

(54) SMART SCHEDULER

(75) Inventors: Hari S Narayan, Bellevue, WA (US); Sivaprasad V Padisetty, Redmond, WA (US); Venkata S S Remany, Remond, WA (US)

(73) Assignee: Microsoft Corporation, Redmond, WA (US)

( * ) Notice: Subject to any disclaimer, the term of this patent is extended or adjusted under 35 U.S.C. 154(b) by 1368 days.

(21) Appl. No.: 11/035,289

(22) Filed: Jan. 12, 2005

(65) Prior Publication Data

US 2006/0156273 A1 Jul. 13, 2006

(51) Int. Cl.
- G06F 9/46 (2006.01)
- G06F 9/00 (2006.01)
- G06F 1/24 (2006.01)
- G06F 13/00 (2006.01)
- G06F 3/00 (2006.01)
- G06F 9/44 (2006.01)
- G06F 11/00 (2006.01)
- G06F 21/00 (2006.01)

(52) U.S. Cl. ............ 718/102; 713/1; 713/100; 711/170; 700/8; 700/10; 700/104; 719/327; 717/121; 714/7; 714/717; 705/56; 705/907

(58) Field of Classification Search .................. 718/104; 709/212, 213; 707/1; 713/100; 711/1; 710/10, 710/200

See application file for complete search history.

(56) References Cited

U.S. PATENT DOCUMENTS

| | | | | |
|---|---|---|---|---|
| 5,327,560 A * | 7/1994 | Hirata et al. ................. 709/221 |
| 5,353,432 A * | 10/1994 | Richek et al. ................. 710/10 |
| 5,623,647 A * | 4/1997 | Maitra ......................... 713/501 |
| 5,771,381 A * | 6/1998 | Jones et al. ................... 713/100 |
| 5,784,612 A * | 7/1998 | Crane et al. .................. 713/100 |
| 5,787,246 A * | 7/1998 | Lichtman et al. ............. 709/220 |
| 5,802,365 A * | 9/1998 | Kathail et al. ................ 719/321 |
| 5,815,731 A * | 9/1998 | Doyle et al. .................... 710/10 |
| 5,819,043 A * | 10/1998 | Baugher et al. ............... 709/222 |
| 5,822,531 A * | 10/1998 | Gorczyca et al. ............. 709/221 |
| 6,029,196 A * | 2/2000 | Lenz ............................. 709/221 |
| 6,066,182 A * | 5/2000 | Wilde et al. ................... 717/175 |
| 6,067,584 A * | 5/2000 | Hayles et al. .................. 710/10 |
| 6,128,730 A * | 10/2000 | Levine ............................ 713/1 |
| 6,161,176 A * | 12/2000 | Hunter et al. ..................... 713/1 |
| 6,247,128 B1 * | 6/2001 | Fisher et al. ................... 713/100 |
| 6,263,382 B1 * | 7/2001 | Bartlett et al. ................. 710/10 |
| 6,345,287 B1 * | 2/2002 | Fong et al. .................... 718/102 |
| 6,513,159 B1 * | 1/2003 | Dodson ......................... 717/178 |
| 6,636,961 B1 * | 10/2003 | Braun et al. ...................... 713/1 |
| 6,711,616 B1 * | 3/2004 | Stamm et al. ................. 709/226 |
| 6,961,937 B2 * | 11/2005 | Avvari et al. .................. 718/104 |
| 7,111,300 B1 * | 9/2006 | Salas et al. .................... 718/105 |
| 7,165,256 B2 * | 1/2007 | Boudnik et al. ............... 718/104 |
| 7,207,040 B2 * | 4/2007 | Boudnik et al. ............... 718/103 |
| 7,281,045 B2 * | 10/2007 | Aggarwal et al. ............. 709/226 |
| 7,356,679 B1 * | 4/2008 | Le et al. ........................... 713/1 |
| 7,406,691 B2 * | 7/2008 | Fellenstein et al. ........... 718/104 |
| 7,426,729 B2 * | 9/2008 | Avvari et al. .................. 718/104 |

(Continued)

Primary Examiner — Emerson C Puente
Assistant Examiner — Adam Lee

(57) ABSTRACT

A smart scheduler is provided to prepare a machine for a job, wherein the job has specific requirements, i.e., dimensions. One or more config jobs are identified to configure the machine to meet the dimensions of the job. Information concerning the machine's original configuration and groupings of config jobs that change the machine's configuration are cached in a central storage. The smart scheduler uses information in the central storage to identify a suitable machine and one or more config jobs to configure the machine to meet the dimensions of a job. The smart scheduler schedules a run for the config jobs on the machine.

14 Claims, 11 Drawing Sheets

U.S. PATENT DOCUMENTS

| | | | |
|---|---|---|---|
| 2001/0034829 A1* | 10/2001 | Fitzgerald et al. | 713/1 |
| 2003/0005180 A1* | 1/2003 | Schmit et al. | 709/328 |
| 2003/0041088 A1* | 2/2003 | Wilson et al. | 709/104 |
| 2003/0120700 A1* | 6/2003 | Boudnik et al. | 709/102 |
| 2003/0120701 A1* | 6/2003 | Pulsipher et al. | 709/102 |
| 2003/0120776 A1* | 6/2003 | Avvari et al. | 709/225 |
| 2003/0120825 A1* | 6/2003 | Avvari et al. | 709/316 |
| 2003/0120829 A1* | 6/2003 | Avvari et al. | 709/330 |
| 2003/0131226 A1* | 7/2003 | Spencer et al. | 713/100 |
| 2003/0159028 A1* | 8/2003 | Mackin et al. | 713/100 |
| 2003/0182425 A1* | 9/2003 | Kurakake | 709/226 |
| 2003/0233385 A1* | 12/2003 | Srinivasa et al. | 709/1 |
| 2004/0015975 A1* | 1/2004 | Nandigama et al. | 718/104 |
| 2004/0015976 A1* | 1/2004 | Lam | 718/104 |
| 2004/0034856 A1* | 2/2004 | Boudnik et al. | 718/103 |
| 2004/0194083 A1* | 9/2004 | Hindle et al. | 717/174 |
| 2004/0199615 A1* | 10/2004 | Philyaw | 709/220 |
| 2005/0066157 A1* | 3/2005 | Korbatits | 713/1 |
| 2005/0081208 A1* | 4/2005 | Gargya et al. | 718/100 |
| 2006/0037016 A1* | 2/2006 | Saha et al. | 717/178 |

\* cited by examiner

SMART SCHEDULER

FIELD OF THE INVENTION

The invention relates to computer software and, more particularly, to automated computing jobs.

BACKGROUND OF THE INVENTION

In today's network computing environments, dozens, hundreds, or even thousands of individual machines may co-exist to perform a variety of computing jobs. A computing job (hereinafter "job") is generally created by a user to automatically perform a wide range of common tasks. For example, some jobs are created to prepare machines to execute tasks (hereinafter "config jobs"). Some jobs are created to clean up machines after running the tasks. Other jobs are created to run the tasks themselves. Some jobs may even be created to do a combination of all three. These different roles of jobs can be classified as config, cleanup, and regular jobs.

In order for the tasks to run successfully on a properly prepared machine, a user needs to ensure that the right jobs are run in the right order. In general, the config jobs, the regular jobs, and the cleanup jobs are not associated with each other. Therefore, a user must manually configure the machines and schedule the jobs to ensure that the right jobs are run on the right machines in the right order. Such a process can be time-consuming if hundreds or thousands of machines need to be configured. Such a process can also make it difficult for people to share tasks, because different tasks may require different setup and cleanup jobs.

In addition, because no apparent connection exists among a config job, a regular job, and a cleanup job, it is hard to optimize the machine preparation process to reduce the number of config and cleanup jobs to be run on different machines. For example, if two regular jobs share the same config and cleanup jobs, conventionally, the config and cleanup jobs are repeated for each of the two regular jobs. It would be more efficient to run the config and the cleanup job only once for both the two regular jobs.

Therefore, there exists a need to automatically schedule jobs such as config jobs and cleanup jobs based on the requirements of other jobs, such as regular jobs. There also exists a need to dynamically prepare machines according to the requirements of a job.

SUMMARY OF THE INVENTION

The invention addresses the above-identified needs by providing a computer-implemented method and a computing system that automatically prepare machines according to the requirements of jobs. In essence, the invention finds an optimal set of machines that are good candidates for running an unscheduled job, finds an optimal set of config jobs to prepare a machine to run the job, and schedules the config jobs to run on the machine.

One aspect of the invention provides a computing system that includes a plurality of machines and a plurality of config jobs. The computing system also includes a central storage containing information concerning the machines and the config jobs. The computing system further includes a smart scheduler component that identifies and schedules one or more config jobs to prepare a machine to run an unscheduled job.

Preferably, the invention stores in the central storage the most current configuration of each machine and each config job. The central storage contains the original configuration of a machine, i.e., the machine configuration that is not changed by any config job. The central storage also contains information of various groupings of config jobs that can set or delete dimensions of a machine.

Another aspect of the invention provides a smart scheduler. The smart scheduler identifies one or more suitable machines that can be prepared to run a job according to the requirement of the job. The smart scheduler also identifies one or more config jobs to prepare a suitable machine to run the job according to the requirements of the job. Preferably, the smart scheduler uses information provided by the central storage to identify the suitable machines and the config jobs that can prepare a suitable machine to run an unscheduled job. Upon identifying the proper config jobs that prepare a suitable machine to run an unscheduled job, the smart scheduler creates a run of the config jobs and schedules the run on the suitable machine. Preferably, the smart scheduler is invoked periodically, for example, every five minutes.

In summary, the invention provides a computing system and a computer-implemented method that automatically prepare available machines to run unscheduled jobs according to the requirements of the jobs. As a result, the invention automates the process for configuring machines to run jobs that require specific machine configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Overview

Embodiments of the invention provide a computer-implemented method and a computing system that automatically prepare one or more machines to run a job according to the requirements of the job. The computer-implemented method is also referred to as the smart scheduler. The invention thus enables automatic scheduling of some jobs such as config jobs based on the requirements of other jobs such as regular jobs.

In embodiments of the invention, each job or machine is associated with one or more requirements, i.e., dimensions. When dimensions of a machine (hereinafter "machine dimensions") match dimensions of a job (hereinafter "job dimensions"), a scheduler can successfully schedule the job to run on the machine. Otherwise, the scheduler (hereinafter "main scheduler") fails to schedule the job. For example, a job may require a machine to have a particular operating system, such as Microsoft® Windows® XP; however, the machine hosts a different operating system. A main schedule won't be able to schedule the job on the machine.

When the main scheduler fails to schedule a job, the smart scheduler comes into play. The smart scheduler identifies the missing job dimensions in a machine and locates suitable config jobs to configure the machine to match the missing job dimensions. For example, the smart scheduler locates an appropriate config job that will change a machine's operating system to Microsoft® Windows® XP, the operating system required by a job. The smart scheduler schedules the appropriate config job to run on the machine. If the config job executes successfully on the machine, the machine is automatically prepared to run the job.

Figure 1:
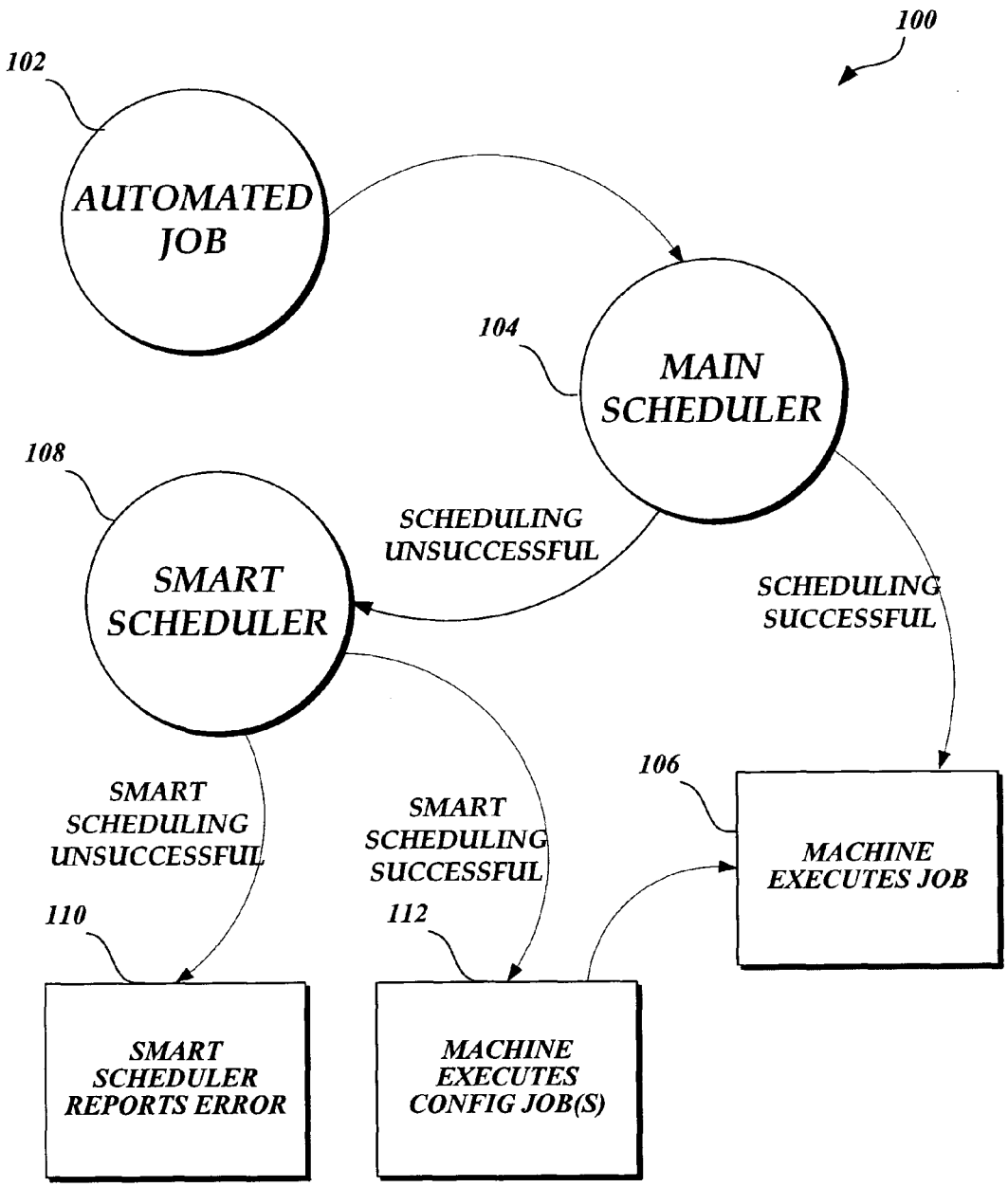
FIG. 1 is a block diagram illustrating exemplary functions of a smart scheduler and its relationship with a main scheduler.

FIG. 1 provides a block diagram illustrating the functionality of a smart scheduler 108 and its relationship with a main scheduler 104. Specifically, a user schedules one or more automated jobs 102 (hereinafter "jobs"). If the main scheduler 104 successfully schedules a job 102 on a machine, the machine executes the job. See block 106. If the main scheduler 104 fails to schedule the job 102 to run on a machine, the smart scheduler 108 takes over. The smart scheduler 108 finds one or more config jobs to prepare the machine according to the dimensions of the job 102 and schedules the machine to run the config jobs. The machine executes the config jobs. See block 112. The machine then executes the job 102 if the config jobs successfully prepare the machine. See block 106. If the smart scheduler 108 fails to prepare the machine to run the job 102, an error message is sent to the user who scheduled the job and the job is not executed. See block 110. The smart scheduler 108 may make subsequent attempts at a configurable time interval to find config jobs to prepare an available machine to run the job 102.

An exemplary embodiment of the invention implements a smart scheduler such as the smart scheduler 108 using Microsoft® SQL Server 2000 stored procedures. Stored procedures are a set of database statements stored in a database server and can perform various database operations. Because the smart scheduler uses data on available machines and config jobs to prepare the available machines, stored procedures enable the smart scheduler fast access to the data needed, which is often stored in the same database server as the stored procedures. However, as known by those skilled in the art and in other related fields, the smart scheduler may be implemented in other software forms or hardware forms.

Figure 2:
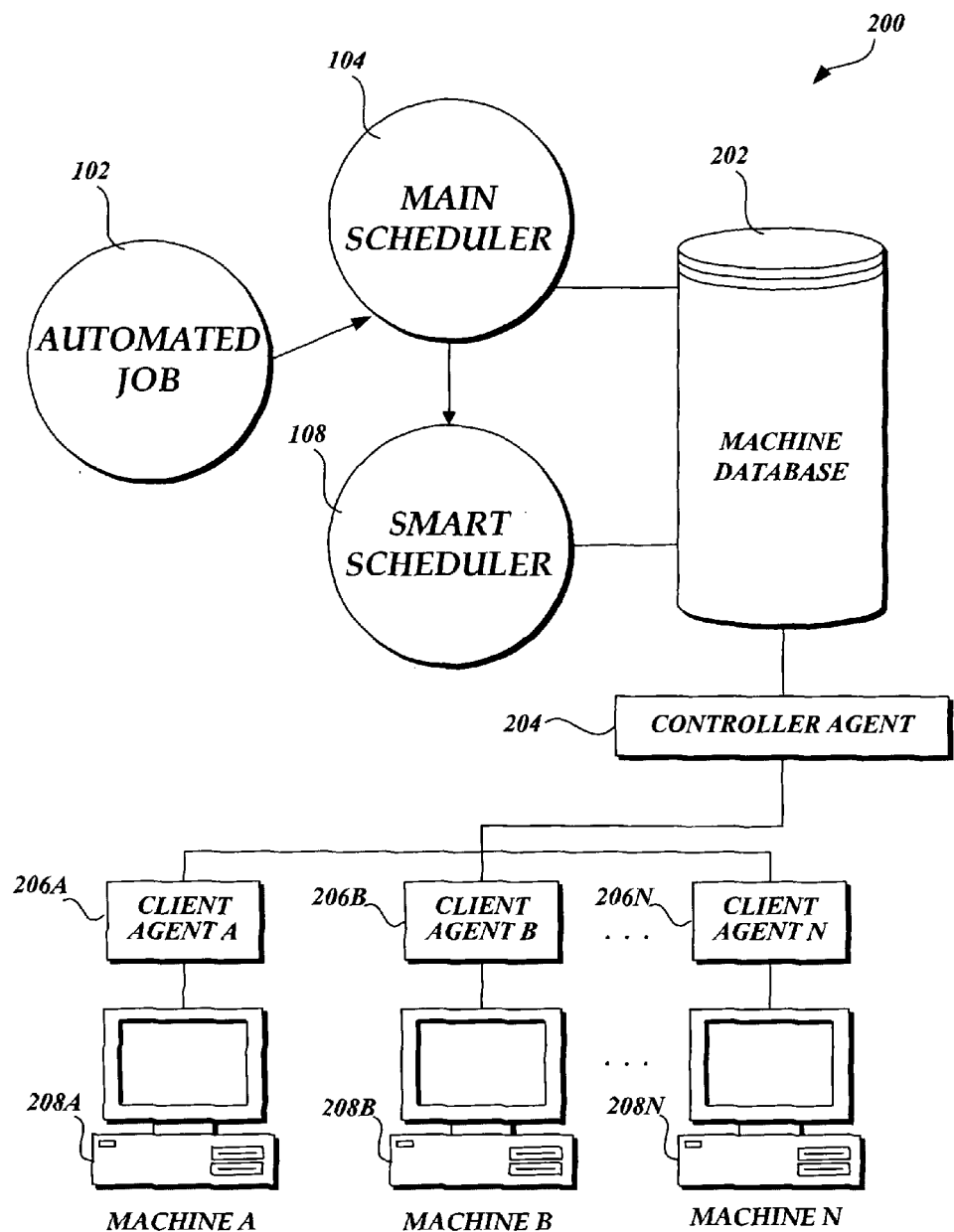
FIG. 2 is a block diagram illustrating an exemplary computing system for implementing the invention.

FIG. 2 is a block diagram illustrating an exemplary computing system 200 for implementing the invention. The computing system 200 comprises a machine database 202 and a plurality of machines 208A-208N. The machine database 202 stores information concerning all machines 208A-208N in the computing system 200. For example, the machine database 202 registers each machine in the computing system 200 and any dimensions associated with the machine. The machine database 202 may also store config jobs that can configure one or more machine dimensions. In some embodiments of the invention, a controller agent 204 is associated with the machine database 202. The controller agent 204 acts as a go-between for the machine database 202 and the machines 208A-208N in the computing system 200. Preferably, each of the machines 208A-208N is associated with a client agent 206A-206N, respectively. The client agents 206A-206N interact with the machines 206A-206N and the machine database 202 (or its controller agent 204) to pass information back and forth.

When scheduling a job 102, the main scheduler 104 queries the machine database 202 to identify one or more machines 208A-208N that match the dimensions required by the job 102. If the query is successful, the main scheduler 104 sends the job 102 to run on the matching machine(s). Otherwise, the smart scheduler 108 takes over. The smart scheduler 108 queries the machine database 202 to identify one or more machines 208A-208N that have the most dimensions required by the job 102 ("suitable machines"). The smart scheduler 108 further queries the machine database 202 to identify one or more config jobs that can prepare a suitable machine to run the job 102.

The smart scheduler 108 then bundles the selected config jobs into a run and schedules the run on the suitable machine. Embodiments of the invention create one run per machine and all the config jobs to be run on the suitable machine will be included in the run. Once the suitable machine completes executing the run, the smart scheduler 108 examines if any config job has failed to execute or if any config job has failed to set one or more dimensions as required by the job 102. In either case, the suitable machine will enter into a debug state, the job 102 will not be run, and an error message may be sent to the user who scheduled the job 102. The user then needs to take appropriate action to rectify the suitable machine, either by running config jobs to clean up the suitable machine or manually restoring the suitable machine based on the error message. If the run of the config jobs successfully prepares a suitable machine, the machine database 202 receives the updated configuration of the suitable machine. As a result, the machine database 202 always contains the most current configurations of the machines 208A-208N in the computing system 200.

Concepts and Data Structures

Figure 3:
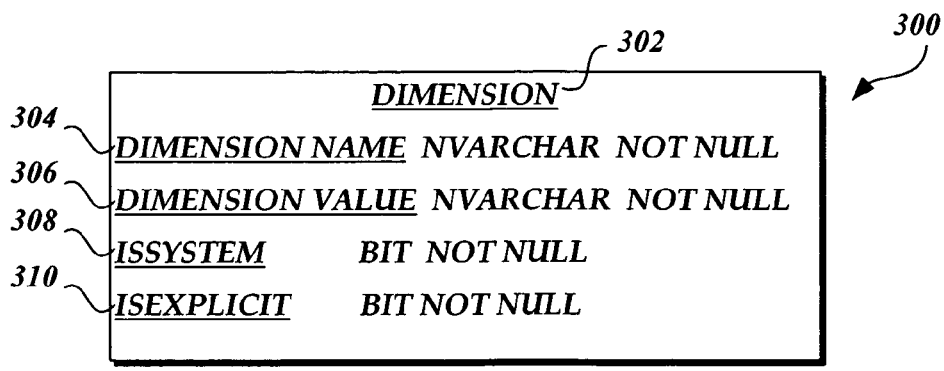
FIG. 3 is a pictorial diagram illustrating an exemplary schema for a dimension.

In exemplary embodiments of the invention, a dimension describes a machine attribute and any necessary hardware or software peripherals. A dimension may have one or more attributes. FIG. 3 illustrates an exemplary schema 300 for a dimension 302 in the invention. A dimension 302 has a dimension name 304 and a dimension value 306. Running a config job on a machine can change the value of a dimension.

A dimension 302 also includes an IsSystem attribute 308 and an IsExplicit attribute 310. An IsSystem attribute 308 indicates whether the dimension 302 is a system dimension. A system dimension cannot be deleted by use of a config job. The invention uses the IsSystem attribute 308 to identify system dimensions and prevent the creation of config jobs that delete system dimensions. A dimension that is not a system dimension can be customized and set by a user. The IsExplicit attribute 310, when set for a machine dimension, denotes that a job will be scheduled on the machine only if the job explicitly asks for the machine dimension.

One exemplary embodiment of the invention provides the following set of dimensions: OS, OSSKU, Language, SP, NetworkDriver, Privates. The OS dimension identifies the operating system running on a machine. OSSKU stands for Operating System Stock Keeping Unit. The OSSKU dimension identifies the type of operating system used on a machine. For example, the Microsoft® Windows® XP operating system includes two main SKUs: a professional type and a home type. The Language dimension specifies the language of the operating system running on a machine. The SP dimension identifies the service pack used by a machine. A service pack usually contains updates or bug fixes for a software program, which generally is the operating system running on the machine. The NetworkDriver dimension identifies the network driver used by a machine. And the Privates dimension identifies whether a private fix has been installed on the machine. A private fix results from a software developer fixing a bug found in the portion of work the developer is responsible for in the development of a software program. The private fix is not yet integrated with the entire software program. The private fix may contain binary files or scripts. These binary files or scripts are called privates. The following data illustrate dimensions associated with two exemplary machines: Machine1 and Machine2.

```
Machine 1
    OS = Win2k
    Language = English
    OSSKU = Professional
    Privates = 25
Machine2
    OS = XP
    OSSKU = Home
    Language = Japanese
    SP = SP1
```

As noted before, a job is an automated computing process that performs one or more tasks such as setting up a machine, executing a software program, or cleaning up a machine after executing a software program. In embodiments of the invention, a job specifies one or more dimensions that the job requires a machine to have so the job can run on the machine. In addition, a job may contain other attributes For example, some jobs only need one machine to run. Other jobs may need multiple machines to run. In the latter case, a job further includes a min_count property and a max_count property. As indicated by their names, the min_count property defines the minimum number of machines that the job needs for proper execution; the max_count property denotes the maximum number of machines that the job needs for proper execution. If a computing system, such as the computing system 200 illustrated in FIG. 2, cannot provide the number of machines specified by the min_count property of a job, neither a main scheduler nor a smart scheduler is able to schedule the job to run.

Embodiments of the invention provide a type of jobs called "config jobs." The smart scheduler uses config jobs to prepare a suitable machine to run a job. A config job can be a SET config job or a DELETE config job. A SET config job sets a dimension to a valid value. A DELETE config job deletes a dimension. A config job may also contain a constraint, which needs to be satisfied before the config job can set or delete one or more dimensions. The following data illustrates some exemplary config jobs, where the %A%, %B%, %C%, and %D% denote specific system values.

```
Config1
    Set: OS = %A%
    Set: SP = SP1
Config2
    Set: OS = XP
    Set: Language = German
Config3 (Depends on Constraint: OS = XP)
    Set: NetworkDriver = %B%
Config4
    Set: Privates = %C%
Config5
    Del: Privates
Config6 (Depends on Constraint: OS = Win2k)
    Set: NetworkDriver = %D%
```

Embodiments of the invention also support config job chaining. At times, to configure one dimension required by a job, more than one config job may be necessary. For example, assume that a job requires a dimension A equal to Value 1. Config job 1 is capable of setting dimension A to Value 1. But Config job 1 has a constraint, i.e., dimension B needs to be Value 2 before Config job 1 can set dimension A to Value 1. In such a case, a Config job 2 that sets dimension B to be Value 2 needs to be run on a machine before Config job 1.

Figure 4:
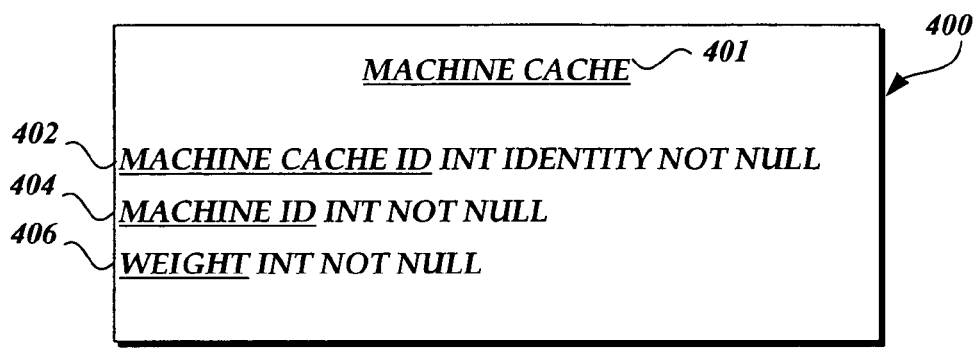
FIG. 4 is a pictorial diagram illustrating an exemplary schema for a machine cache table.
Figure 5:
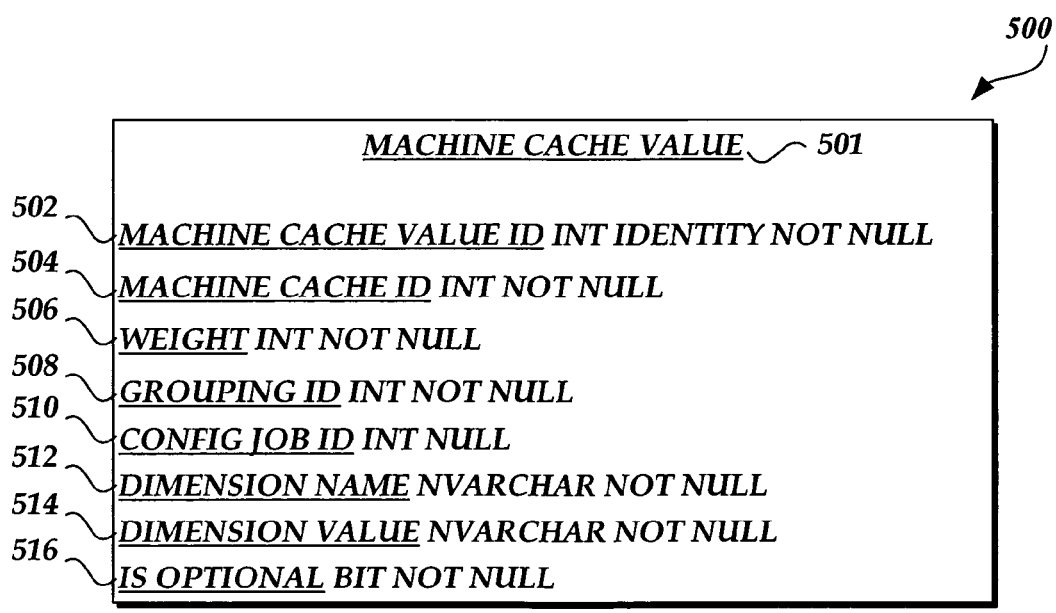
FIG. 5 is a pictorial diagram illustrating an exemplary schema for a machine cache value table.

In some embodiments of the invention, before triggering the smart scheduler, a machine configuration caching process is called to calculate and store the relationship between config jobs and machine dimensions. Once the machine configuration caching process calculates the relationship, the relationship is stored in data structures in a central storage such as the machine database 202 illustrated in FIG. 2. The data structures may include a machine cache table and a machine cache value table. FIG. 4 and FIG. 5 illustrate exemplary schemas 400, 500 for a machine cache table 401 and a machine cache value table 501.

As shown in FIG. 4, the machine cache table 401 contains a machine cache ID 402 field that identifies a particular machine cache table. The machine cache table 401 also includes a machine ID 404 field that identifies a machine. The machine cache table 401 further contains a weight 406 field. As later discussion will show, the weight 406 field is used to distinguish between a machine's original configuration and machine configurations resulted from applying one or more config jobs.

FIG. 5 illustrates an exemplary schema 500 for a machine cache value table 501. The machine cache value table 501 contains a machine cache value ID 502 field that identifies the table itself. The machine cache value table 501 also contains a machine cache ID 504 field that identifies the machine cache table that contains entries of machines identified in the machine cache value table 501. A weight 506 field is also included to identify whether a grouping of machine dimensions is the original configuration of a machine or a changed configuration of the machine. The grouping ID 508 field identifies different configuration groupings. The config job ID 510 field identifies a specific config job. The dimension name 512 field identifies a dimension of the machine. The dimension value 514 field identifies the current value of the dimension identified by the dimension name 512. The IsOptional 516 field identifies whether a dimension 512 is optional. An optional machine dimension is used only when a job explicitly requests the dimension.

In addition, the machine database 202 may also store other data structures such as a constraint conflict table containing any config job whose constraint conflicts with the configuration of another config job.

The Smart Scheduling Process

Figure 6:
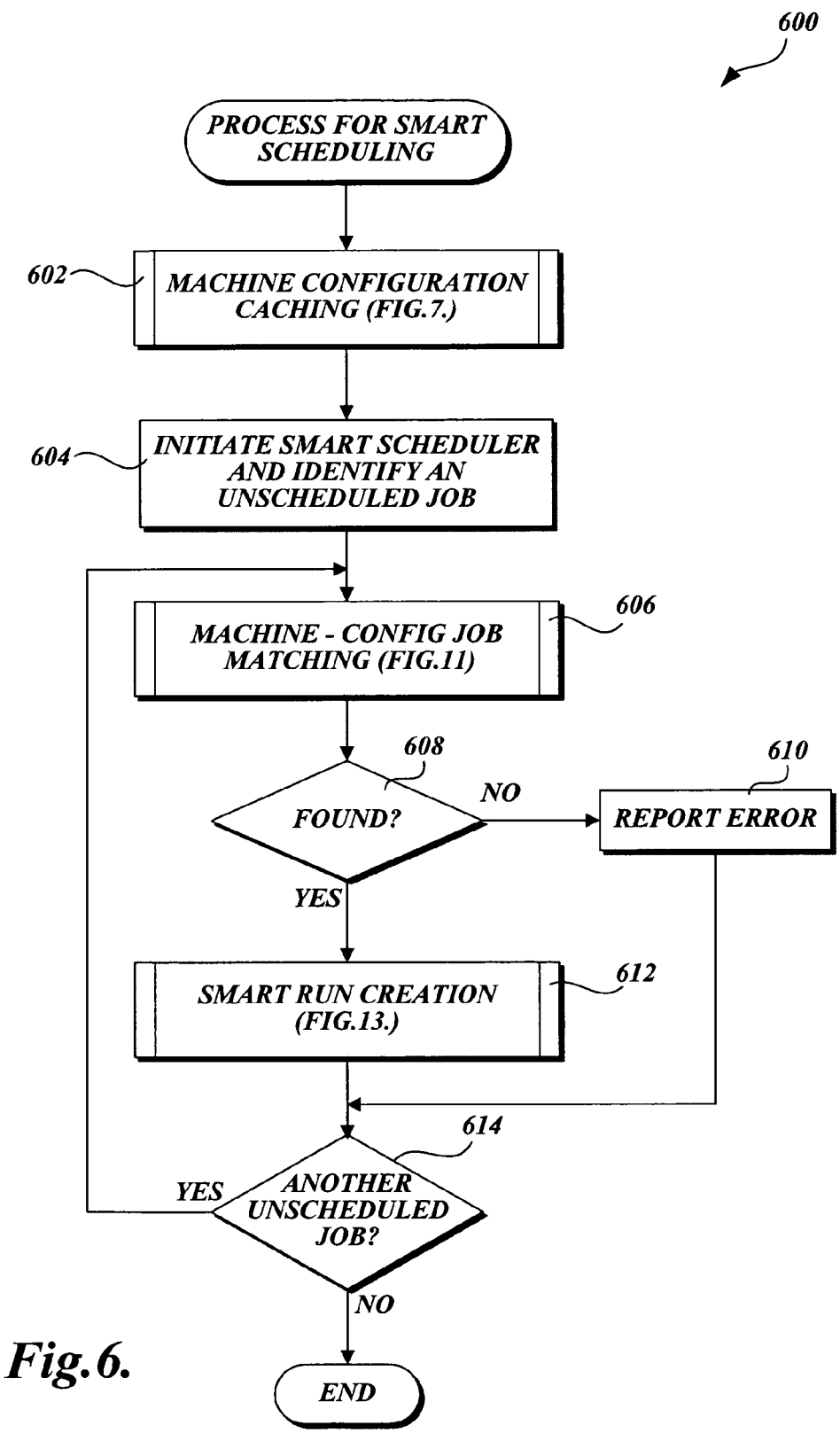
FIG. 6 is a flow diagram illustrating an exemplary smart scheduling process.
Figure 7:
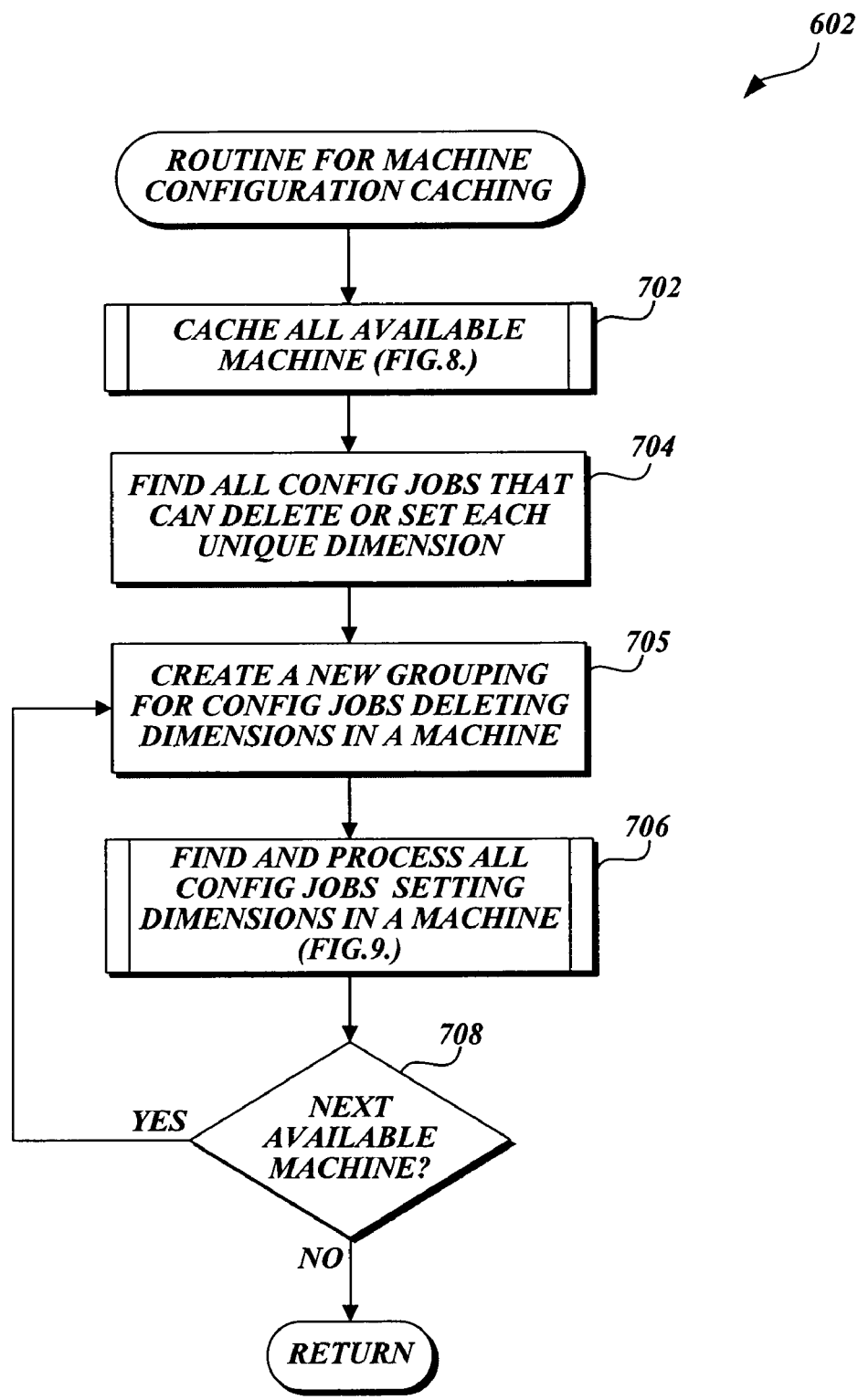
FIG. 7 is a flow diagram illustrating an exemplary routine for machine configuration caching, suitable for use in FIG. 6.

FIG. 6 is a flow diagram illustrating an exemplary process 600 for smart scheduling, i.e., the operations performed by a smart scheduler such as the smart scheduler 108 illustrated in FIGS. 1 and 2. Preferably, the process 600 first enters into a routine 602 for machine configuration caching. The routine 602 registers each available and non-cached machine in the machine cache table 401. The routine 602 also establishes groupings for each machine according to its existing configuration and configurations produced by different config jobs. The routine 602 stores the grouping information in the machine cache value table 501. FIG. 7 illustrates an exemplary implementation of the routine 602 and will be discussed in detail later.

Figure 11:
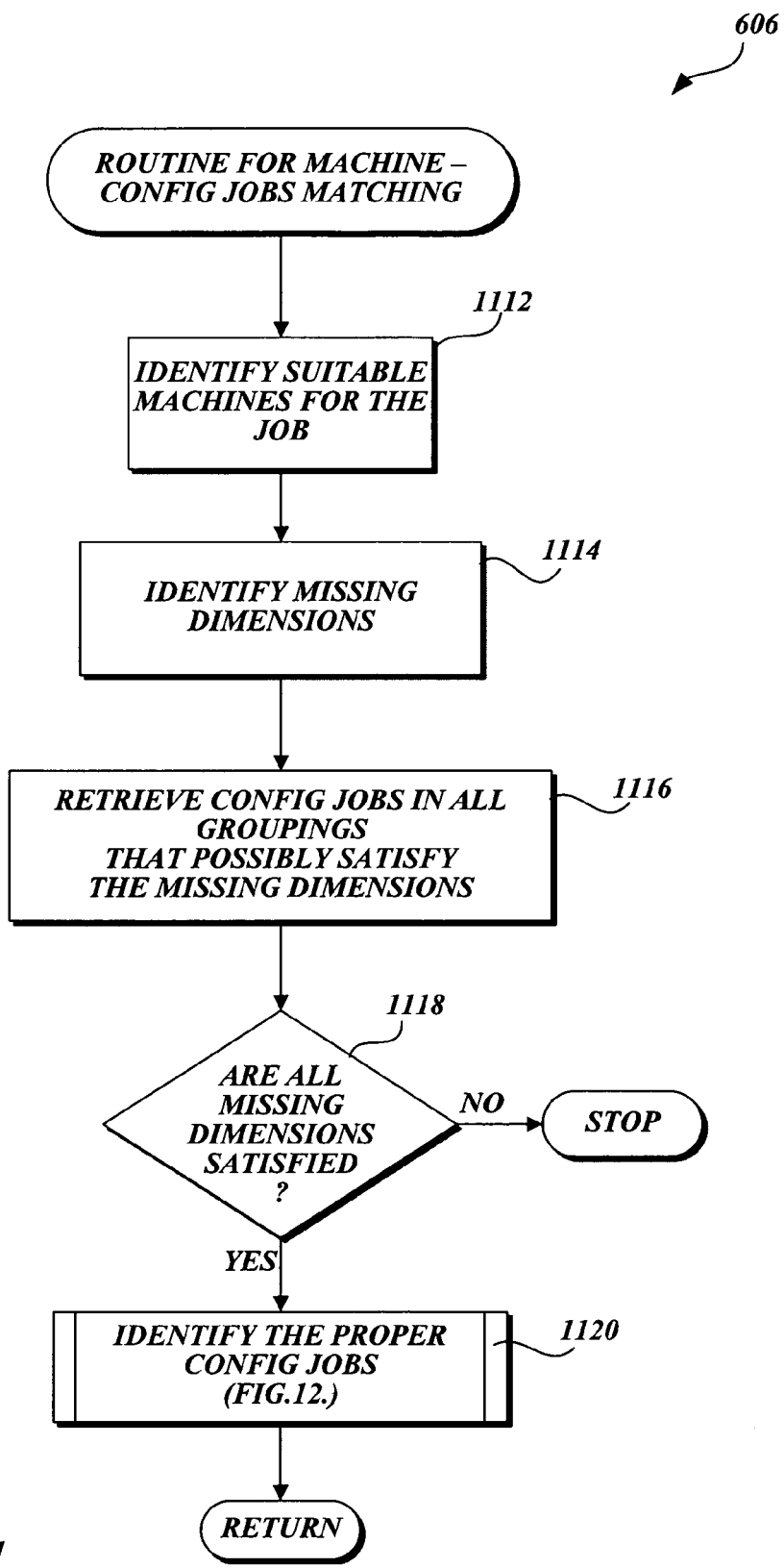
FIG. 11 is a flow diagram illustrating an exemplary routine for machine-config job matching, suitable for use in FIG. 6.

The process 600 then initiates the smart scheduler and identifies an unscheduled job. See block 604. In exemplary embodiments of the invention, the smart scheduler is initialized with a configurable frequency. For example, an exemplary embodiment of the invention schedules the smart scheduler to run every five minutes. The process 600 then executes a machine-config job matching routine 606 that identifies one or more suitable machines to be prepared for running a job. A suitable machine may be a machine that requires running the fewest number of config jobs in order to be prepared for running the job. The routine 606 also identifies suitable config jobs to prepare a suitable machine for running the job. FIG. 11 illustrates an exemplary implementation of the routine 606 and will be described in detail later.

Figure 13:
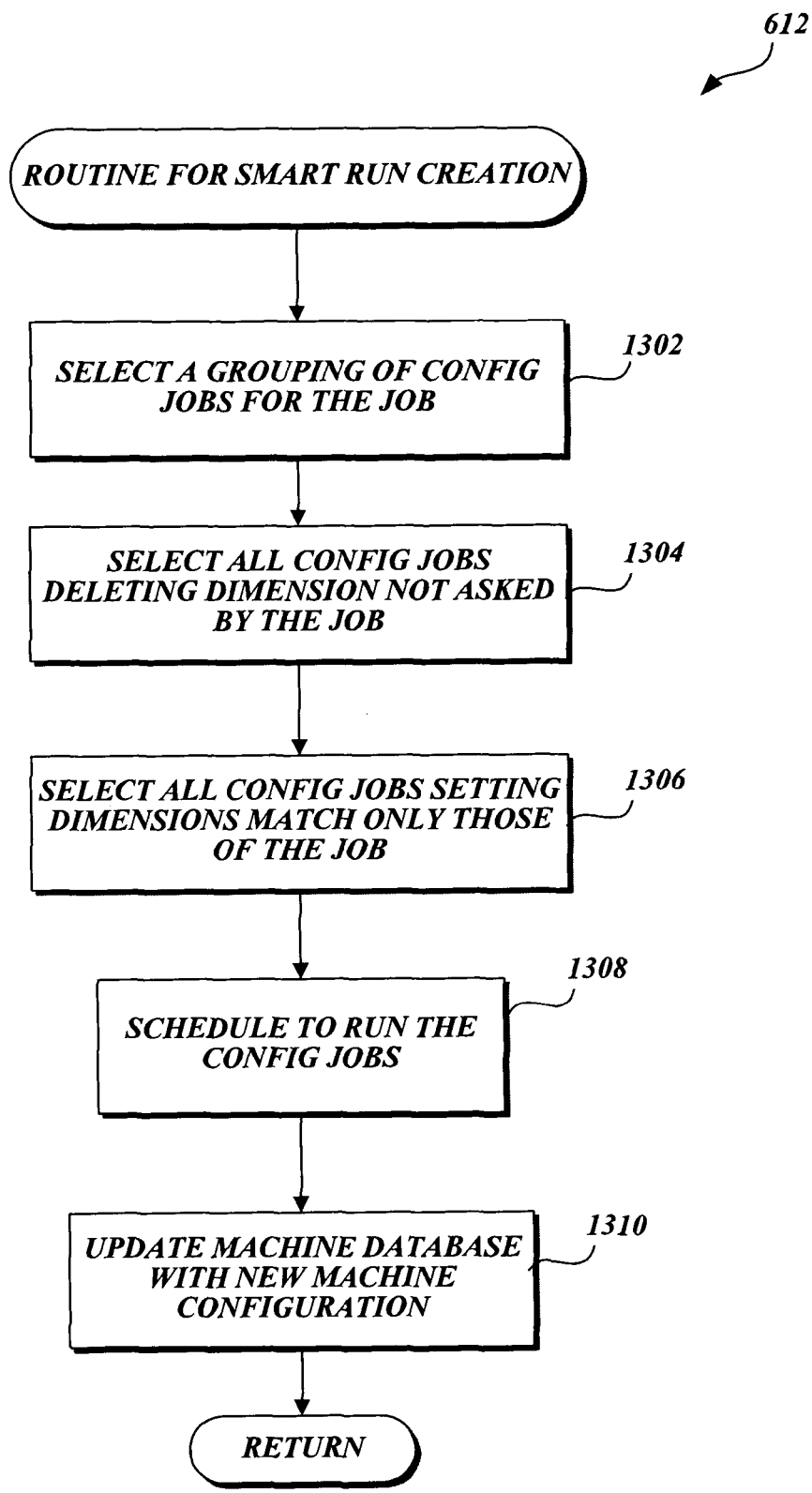
FIG. 13 is a flow diagram illustrating an exemplary routine for creating a smart run of identified config jobs to prepare a machine to run a job, suitable for use in FIG. 6.

After executing the routine 606, the process 600 proceeds to determine whether the routine 606 has found one or more suitable machines and one or more suitable groupings of config jobs to prepare the suitable machines for running the job. See decision block 608. If the answer is NO, the process 600 proceeds to report an error message, for example, to the user who scheduled the job. See block 610. If the answer is YES, the process 600 enters a routine 612 that creates a smart run containing all the config jobs that need to be run on a suitable machine to prepare it to execute the job properly. FIG. 13 illustrates an exemplary implementation of the routine 612 and will be discussed later.

After executing the routine 612, the process 600 proceeds to determine whether there is another job that has failed to be scheduled by the main scheduler. See decision block 614. If the answer is YES, the process 600 loops back to block 606 to execute the routine 606 to find one or more suitable machines and suitable config jobs to prepare a suitable machine for running the unscheduled job. If the answer to decision block 614 is NO, meaning that there are no more unscheduled jobs for this run of the smart scheduler, the process 600 ends. The smart scheduler will be initialized during the next time interval, for example, five minutes later.

Machine Configuration Caching Process

As noted above, FIG. 7 illustrates an exemplary implementation of the routine 602 that caches machine configuration information including the machine's original configuration and any configurations resulted by applying config jobs. The information generated by the routine 602 is stored in the machine database 202 and is used by the smart scheduler to identify suitable machines and config jobs in the routine 612.

Figure 8:
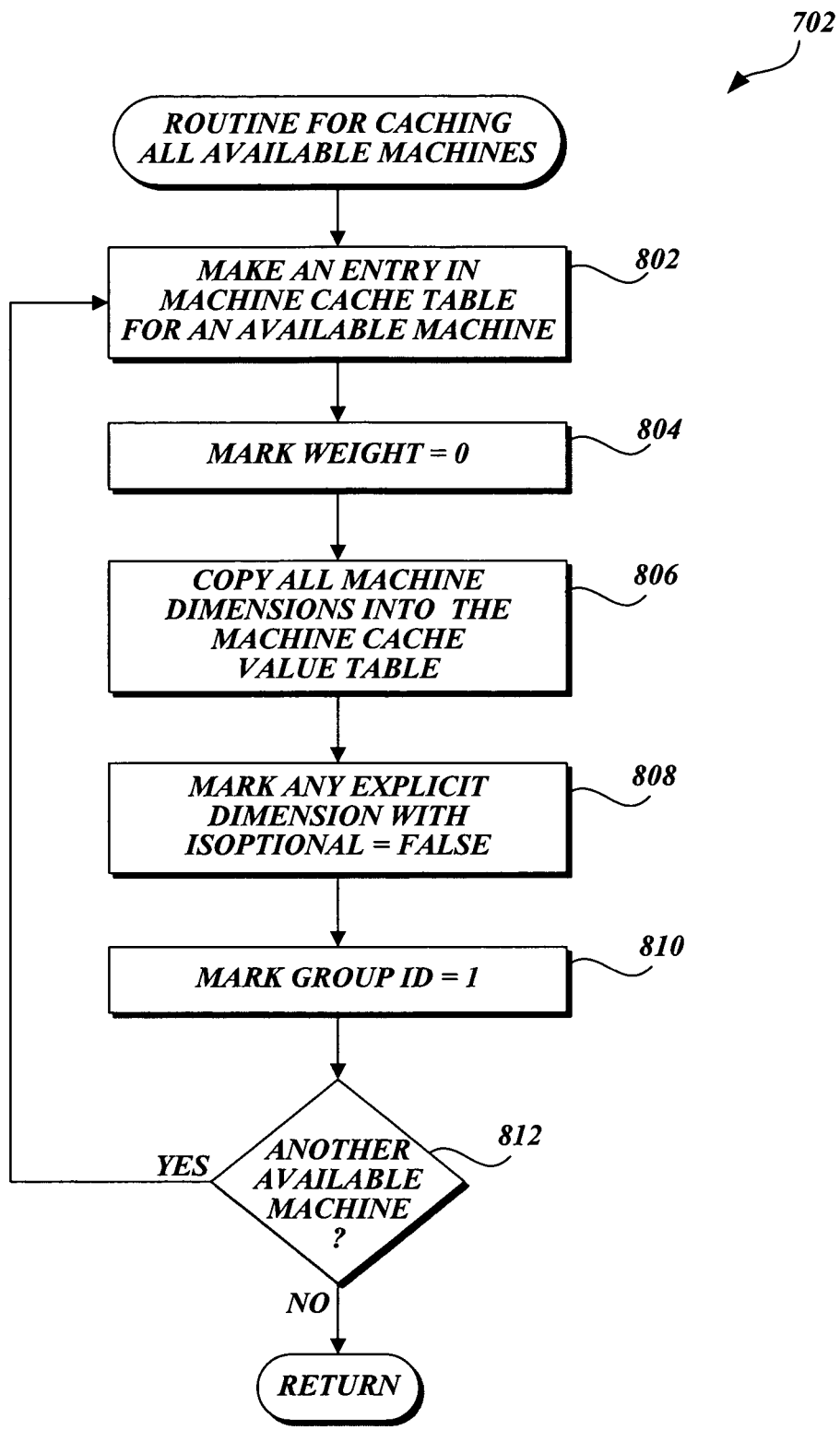
FIG. 8 is an exemplary process for caching the original configuration of a machine, suitable for use in FIG. 7.

Specifically, the routine 602 first enters into a process 702 that caches information concerning all available and non-cached machines into the machine cache table 401 and the machine cache value table 501, illustrated in FIG. 4 and FIG. 5, respectively. FIG. 8 illustrates an exemplary implementation of the process 702 and will be discussed in detail later. As a result of executing the process 702, the original dimension values of a machine are entered into the machine cache value table 501, wherein their corresponding weight 506 fields are set equal to zero and grouping ID 508 fields are set equal to one. Because none of the original dimension values would be associated with a config job at this moment, the config job ID 510 field for each of the original dimension values will be set to NULL.

Figure 9:
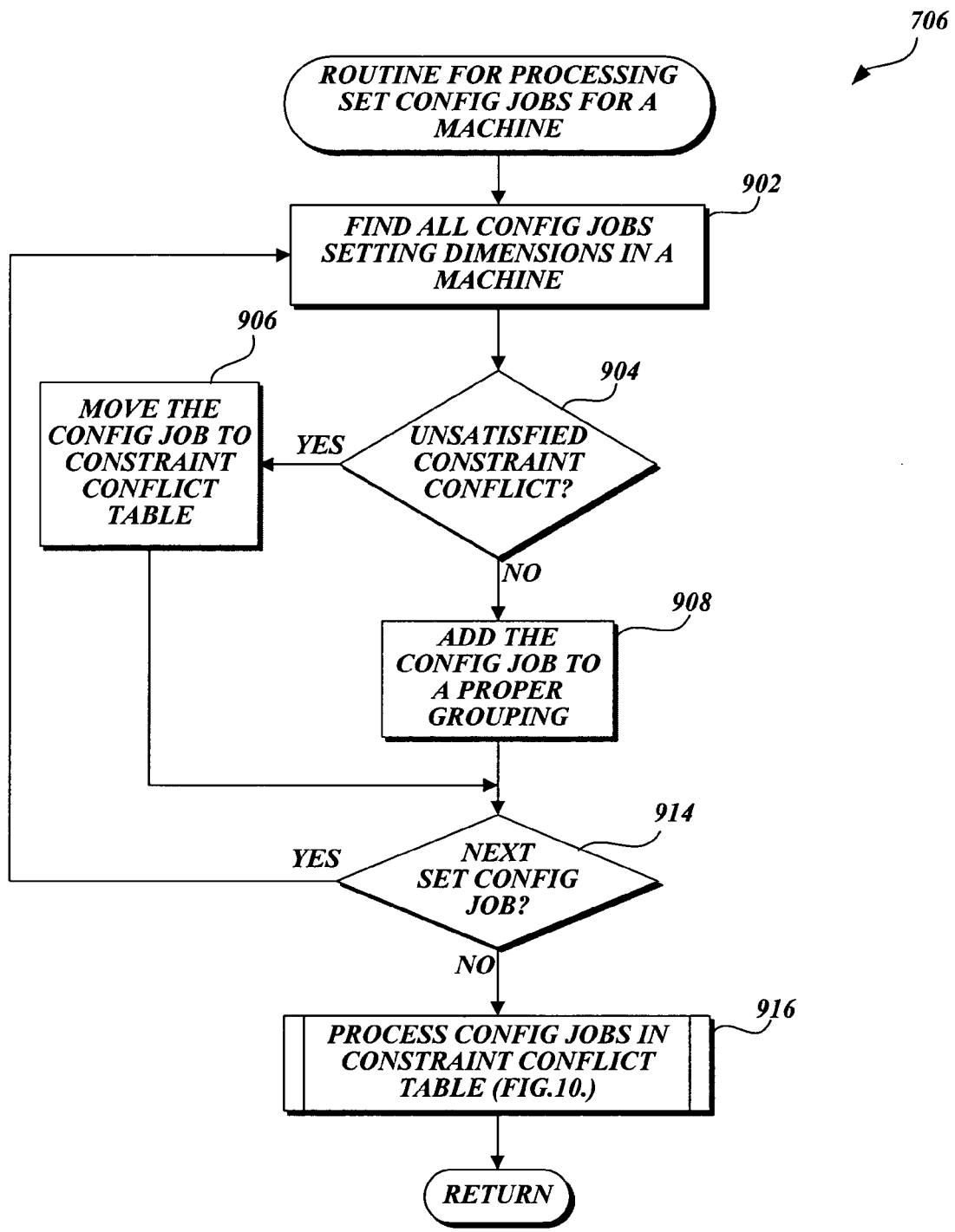
FIG. 9 is a flow diagram illustrating an exemplary process for processing all SET config jobs for a machine, suitable for use in FIG. 7.

After executing the process 702, the routine 602 finds all config jobs that set or delete each unique dimension of the machines cached by the process 702. See block 704. The routine 602 then processes each of the machines cached by the process 702. Among the config jobs identified in block 704, the routine 602 first identifies config jobs that delete one or more dimensions of a machine. The routine 602 also creates a new grouping containing the DELETE config jobs and the dimensions in the original configuration of the machine, that is, the dimensions in the grouping with the Grouping ID 508 field value set to one. See block 705. The routine 602 then executes a process 706 that identifies and processes all SET config jobs for the machine among the config jobs identified in block 704. See block 706. FIG. 9 illustrates an exemplary implementation of the process 706 and will be discussed in detail later.

After executing the process 706, the routine 602 checks if there is another available machine cached by the process 702. See decision block 708. If the answer is YES, the routine 602 loops back to block 705 to process config jobs for this machine. If the answer is NO, meaning the routine 602 has processed all available machines, the routine 602 returns. As a result of executing the routine 602, the machine cache table 401 and the machine cache value 501 hold information concerning each available machine that can be used by the smart scheduler 108 and config jobs that can configure one or more dimensions of an available machine.

As noted above, FIG. 8 illustrates an exemplary implementation of the process 702 that registers information concerning all available machine into the machine cache table 401 and the machine cache value table 501, illustrated in FIGS. 4 and 5, respectively. Specifically, the process 702 makes an entry in the machine cache table 401 for each available and non-cached machine. See block 802. The process 702 sets the weight 406 field of the entry to be zero. See block 804. A value of zero for the weight 406 field specifies the default configuration as existing on the machine. On the other hand, a positive value for the weight 406 field specifies the configuration of the machine that will be obtained as a result of running one or more config jobs. The value of the weight 406 field thus enables the main scheduler and the smart scheduler to select the proper machine configuration. The main scheduler only considers the configuration of machines whose weight 406 field value equals zero when trying to find machines for a job such as the job 102 illustrated in FIGS. 1 and 2. The smart scheduler looks at configurations of machines whose weight 406 field value is greater than zero to find the corresponding config jobs to prepare the machine per the requirements of a job.

For every entry in the machine cache table 401, the process 702 caches all dimensions of the machine into the machine cache value table 501. See block 806. If an entry in the machine cache table 401 has a weight 406 field value equal to zero, the corresponding machine's configuration will be stored as is in the machine cache value table 501; the config job ID 510 field for such an entry will be set to NULL. For any explicit dimension of the machine, the process 702 sets the IsOptional 516 bit to be FALSE. See block 808. The process 702 also sets the grouping ID 508 field value for such an entry to be one. See block 810. Later, groupings of dimensions of the machine according to different configuration jobs will have a grouping ID 508 field value greater than one. The process 702 then proceeds to check if there is another available and non-cached machine. See decision block 812. If the answer if YES, the process 702 loops back to block 802. Otherwise, the process 702 returns.

As noted above, FIG. 9 illustrates an exemplary implementation of the process 706 that finds and processes all config jobs setting one or more dimensions of a machine. The process 706 first finds all config jobs setting one or more dimensions of the machine. See block 902. For each such SET config job, the process 706 examines if the config job causes any unresolved constraint conflict. See decision block 904. While doing the constraint conflict check, the process 706 considers previous config jobs that have been selected to configure one or more dimensions of the machine. For example, the above cited config jobs Config 2 and Config 6 cannot coexist in the same grouping for a machine. The constraint for Config 6 is that the operating system of the machine should be Microsoft® Windows® 2000; however, Config 2 sets the operating system of the machine to be Microsoft® Windows® XP. Therefore, the constraint of Config 6 conflicts with Config 2; Config 6 cannot co-exist with Config 2 in the same grouping.

If the answer to decision block 904 is YES, the process 706 moves the SET config job to a constraint conflict table for later processing. See block 906. The process 706 then proceeds to decision block 914 to process the next SET config job, if there is any.

If the answer to decision block 904 is NO, meaning the SET config job causes no constraint conflict or that any constraint conflict it causes has been satisfied, the process 706 proceeds to add the SET config job to an appropriate grouping. See block 908. If the SET config job does not have a constraint or if the constraint is satisfied by current configuration of the machine, the process 706 creates a new grouping that include the SET config job and all the dimensions from the base grouping (Grouping ID=1). If the SET config job has one or more constraints that are satisfied by another SET config job in the current grouping, the SET config job is added to the current grouping.

Figure 10:
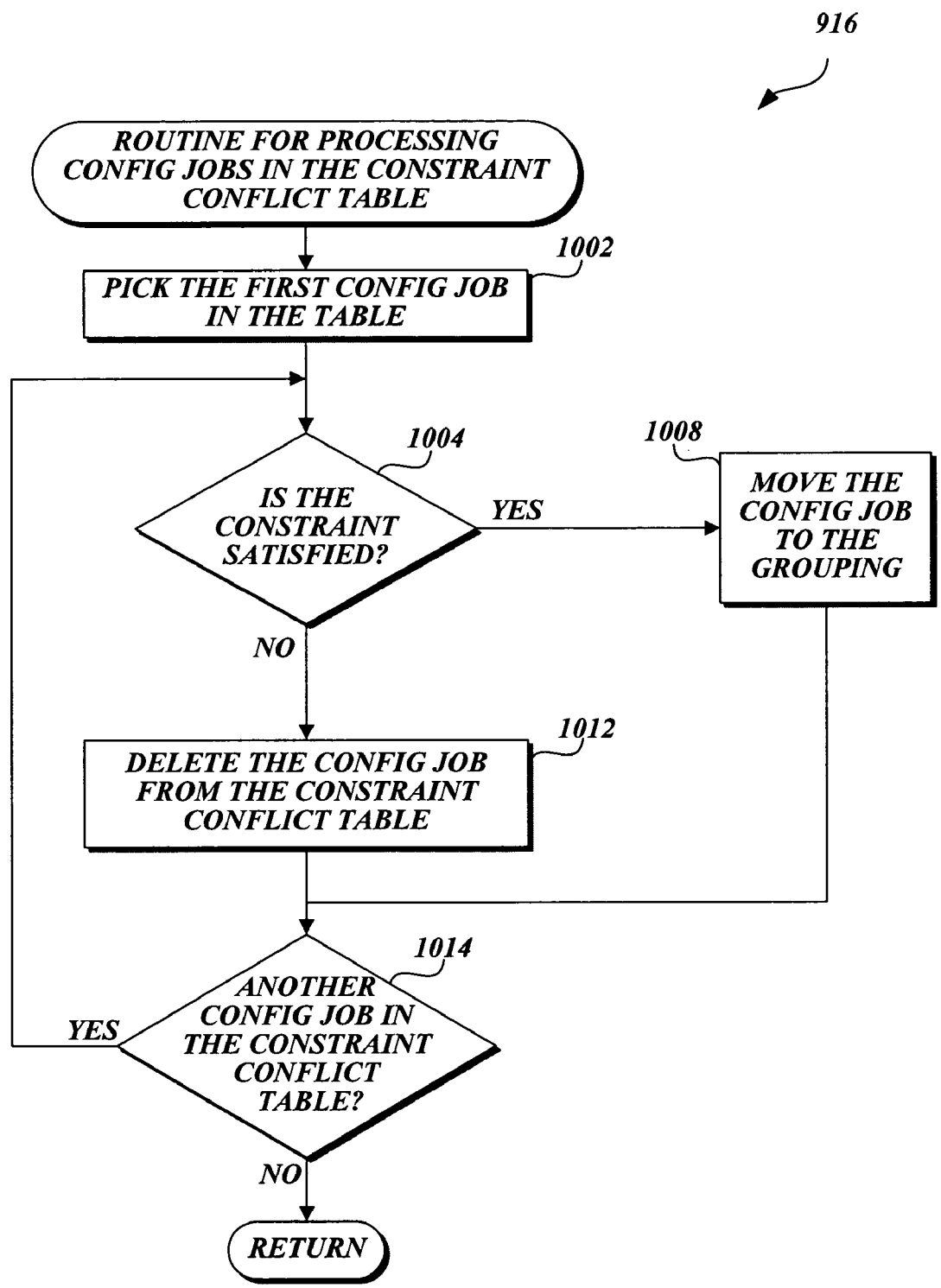
FIG. 10 is a flow diagram illustrating an exemplary routine for processing config jobs in a constraint conflict table, suitable for use in FIG. 9.

The process 706 then proceeds to decision block 914 to check if there is another SET config job. See decision block 914. If the answer is YES, the process 706 loops back to block 902. If the answer to decision block 914 is NO, the process 706 has processed all SET config jobs for the machine. The process 706 then enters a routine 916 to process all the config jobs in the constraint conflict table. See block 916. The result of executing the routine 916 is that any config job in the constraint conflict table will either be moved into the current grouping or deleted from the constraint conflict table. FIG. 10 illustrates an exemplary implementation of the routine 916 and will be discussed in detail shortly. After successfully executing the routine 916, i.e., no conflict constraints exist in the grouping of the dimensions, the process 706 returns.

As noted above, FIG. 10 illustrates an exemplary implementation of the routine 916 that processes config jobs in the constraint conflict table. The routine 916 processes each config job existing in the constraint conflict table. The routine 916 starts by picking the first config job in the constraint conflict table. See block 1002. The routine 916 checks whether the constraint contained in the config job is now satisfied by config jobs in the grouping. See decision block 1004. If the answer is YES, the routine 916 moves the config job to the current grouping. See block 1008. The routine 916 then proceeds to process the next config job in the constraint conflict table, if there is one. If the answer to decision block 1004 is NO, the routine 916 deletes the config job from the constraint conflict table. See block 1012. The routine 916 then checks if there is another config job in the constraint conflict table. See decision block 1014. If the answer is YES, the routine 916 loops back to decision block 1004 to see if the constraint in this config job has been satisfied. If there are no more config jobs in the constraint conflict table, the routine 916 returns.

The table below illustrates the result of performing the machine configuration caching routine 602 for the exemplary Machine1 and Machine 2.

| Machine Cache ValueID | Machine Name | Weight | Grouping | Config Job Name | Dimension Name | Dimension Value | IsOptional |
|---|---|---|---|---|---|---|---|
| 1 | Machine1 | 0 | 1 | NULL | OS | Win2k | True |
| 2 | Machine1 | 0 | 1 | NULL | Language | English | True |
| 3 | Machine1 | 0 | 1 | NULL | OSSKU | Professional | True |
| 4 | Machine1 | 0 | 1 | NULL | Privates | 25 | False |
| 5 | Machine1 | 1 | 2 | NULL | OS | Win2k | True |
| 6 | Machine1 | 1 | 2 | NULL | Language | English | True |
| 7 | Machine1 | 1 | 2 | NULL | OSSKU | Professional | True |
| 8 | Machine1 | 1 | 2 | Config5 | Privates | 25 | True |
| 9 | Machine1 | 1 | 2 | Config1 | OS | % A % | True |
| 10 | Machine1 | 1 | 2 | Config1 | SP | SP1 | True |
| 11 | Machine1 | 1 | 2 | Config3 | NetworkDriver | % B % | True |
| 12 | Machine1 | 1 | 2 | Config4 | Privates | % C % | True |
| 13 | Machine1 | 1 | 3 | NULL | OS | Win2k | True |
| 14 | Machine1 | 1 | 3 | NULL | Language | English | True |
| 15 | Machine1 | 1 | 3 | NULL | OSSKU | Professional | True |
| 16 | Machine1 | 1 | 3 | Config5 | Privates | 25 | True |
| 17 | Machine1 | 1 | 3 | Config2 | OS | XP | True |
| 18 | Machine1 | 1 | 3 | Config2 | Language | German | True |
| 19 | Machine1 | 1 | 3 | Config3 | NetworkDriver | % B % | True |
| 20 | Machine1 | 1 | 3 | Config4 | Privates | % C % | True |
| 21 | Machine1 | 1 | 4 | NULL | OS | Win2k | True |
| 22 | Machine1 | 1 | 4 | NULL | Language | English | True |
| 23 | Machine1 | 1 | 4 | NULL | OSSKU | Professional | True |
| 24 | Machine1 | 1 | 4 | Config5 | Privates | 25 | True |
| 25 | Machine1 | 1 | 4 | Config6 | NetworkDriver | % D % | True |
| 26 | Machine1 | 1 | 4 | Config4 | Privates | % C % | True |
| 27 | Machine2 | 0 | 1 | NULL | OS | XP | True |
| 28 | Machine2 | 0 | 1 | NULL | OSSKU | Home | True |

-continued

| Machine Cache ValueID | Machine Name | Weight | Grouping | Config Job Name | Dimension Name | Dimension Value | IsOptional |
|---|---|---|---|---|---|---|---|
| 29 | Machine2 | 0 | 1 | NULL | Language | Japanese | True |
| 30 | Machine2 | 0 | 1 | NULL | SP | SP1 | True |
| 31 | Machine2 | 1 | 2 | Config1 | OS | % A % | True |
| 32 | Machine2 | 1 | 2 | Config1 | SP | SP1 | True |
| 33 | Machine2 | 1 | 2 | Config4 | Privates | % C % | True |
| 34 | Machine2 | 1 | 3 | NULL | OS | XP | True |
| 35 | Machine2 | 1 | 3 | NULL | OSSKU | Home | True |
| 36 | Machine2 | 1 | 3 | NULL | Language | Japanese | True |
| 37 | Machine2 | 1 | 3 | NULL | SP | SP1 | True |
| 38 | Machine2 | 1 | 3 | Config2 | OS | XP | True |
| 39 | Machine2 | 1 | 3 | Config2 | Language | German | True |
| 40 | Machine2 | 1 | 3 | Config3 | NetworkDriver | % B % | True |
| 41 | Machine2 | 1 | 3 | Config4 | Privates | % C % | True |

In embodiments of the invention, whenever a machine's configuration changes, the data in the machine cache table 401 will be deleted and repopulated during the next smart scheduler run. This approach ensures that the machine cache table 401 always represents the latest configuration of a machine.

Similarly, whenever a config job changes, the data in the machine cache table 501 will be deleted and repopulated during the next smart scheduler run. This approach ensures that the machine cache table 501 always represents the most updated config jobs.

Machine-Config Job Matching Process

As noted above when describing FIG. 6, FIG. 11 illustrates an exemplary implementation of the routine 606. In essence, the routine 606 finds one or more suitable machines to prepare for a job 102 and groupings of config jobs for preparing the suitable machines, using information stored in the machine cache table 501 and the machine value cache table 501. As noted before, when a job 102 requires multiple machines to run, the job 102 has a min_count property that specifies the minimum number of machines that the job 102 needs. Thus, prior to executing the routine 606, the smart scheduler 108 has already calculated the number of machines needed to execute the job 102. If there are not enough machines available, the smart scheduler 108 stops here and sends an error message to the user who scheduled the job.

Figure 12:
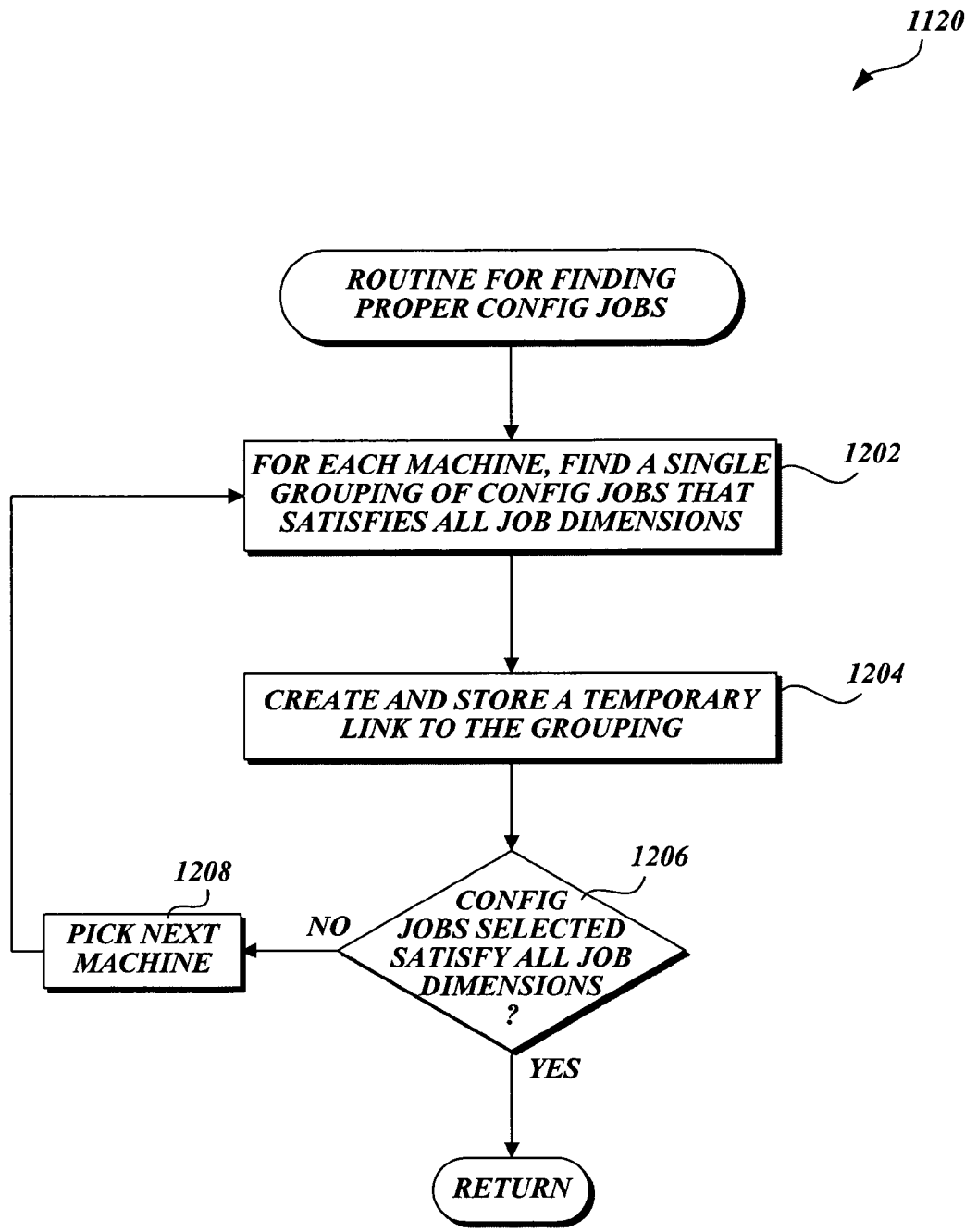
FIG. 12 is a flow diagram illustrating an exemplary routine for identifying proper config jobs to prepare suitable machines to run a job, suitable for use in FIG. 11.

The routine 606 first identifies one or more suitable machines to be prepared for executing the job 102. See block 1112. A suitable machine may be an available machine that requires the fewest config jobs to prepare. For a job 102 that requires a minimum number of machines to run, the number of suitable machines should match the min_count property of the job 102. The routine 606 then proceeds to compare the dimensions of the job 102 with the original configuration of a suitable machine, i.e., the grouping with grouping ID 102 field set to one in the machine's cache value table 501. See block 1114. Through the comparison, the routine 606 identifies the job dimensions that the suitable machine does not match. From the groupings in the machine cache value table 501, the routine 606 retrieves config jobs that possibly satisfy the missing dimensions. See block 1116. Preferably, the routine 606 stores the retrieved config jobs in a machine cache dimension structure. The routine 606 may confirm whether some of the retrieved config jobs indeed satisfy all the missing dimensions. See decision block 1118. If the answer is NO, the smart scheduler 108 stops running after reporting an error message to the user who scheduled the job, indicating that no suitable machine is available to run the job. On the other hand, a YES answer to the decision block 1118 leads the routine 606 to a process 1120 that processes the retrieved config jobs to identifies the proper config jobs to set up one or more suitable machines for executing the job 102. See block 1120. FIG. 12 illustrates an exemplary implementation of the process 1120 and will be discussed shortly. After executing the process 1120, the routine 606 returns.

As noted above, FIG. 12 illustrates an exemplary implementation of the process 1120 that identifies proper config jobs for preparing suitable machines to execute a job 102. For each suitable machine, the process 1120 finds a single grouping of config jobs for the machine that satisfies all job dimensions. See block 1202. Preferably, the process 1120 establishes and stores a temporary link to the grouping. See block 1204. The temporary link enables the smart scheduler 108 to reuse the grouping in the future without reexecuting the machine-config job matching process, i.e., the routine 606 again. The process 1120 then proceeds to check if the config jobs selected satisfy all dimensions of a job 102. See decision block 1206. If the answer is YES, meaning that the process 1120 has found config jobs that prepare a suitable machine for a job 102, the process 1120 returns, if the job 102 only needs one machine to run. If the job 102 requires more than one machine to run, the process 1120 processes the suitable machines until the job 102 has found the number of machines identified by its min_count property. If the answer to decision block 1206 is NO, meaning that this machine cannot be configured to satisfy all dimensions of the job 102, the process 1120 proceeds to pick the next suitable machine. See block 1208. The process 1120 then loops back to block 1202 to process the next suitable machine.

Smart Run Creation Process

As noted above when describing FIG. 6, FIG. 13 illustrates an exemplary implementation of routine 612 that creates a smart run of config jobs to prepare a machine for running a job 102. The routine 612 starts by selecting a grouping of config jobs for the machine, wherein the config jobs in the grouping will configure the machine to have the dimensions required by the job. See block 1302. The routine 612 does not select any grouping that contains an explicit dimension if the job 102 does not specifically ask for such a dimension. The routine 612 then selects all DELETE config jobs in the grouping to delete dimensions that are not asked for by the job. See block 1304. The routine 612 then selects all config jobs setting dimensions only required by the job 102. See block 1306. Any config job that sets a dimension not required by the job 102 will be ignored. The routine 612 then schedules to run the selected config jobs. See block 1308. Executing the config jobs changes the configuration of the machine. The routine 612 then updates the machine database 202 with the changed machine configuration so that the machine database 202 always represents the latest configuration of a machine. See block 1310. The routine 612 then returns. The smart scheduler 108 thus has prepared one or more machines for running the job 102.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. At least one non-transitory computer readable storage medium having instructions encoded thereon which, when executed, perform a method for automatically preparing a machine that has one or more dimensions ("machine dimensions"), each having a dimension value, to execute an automated computing job ("job") that has one or more dimensions ("job dimensions"), each having a dimension value, wherein a job dimension is an explicit dimension which indicates that a job will be executed on a machine having the dimension only if the job explicitly requires the dimension, the method comprising:
   attempting to schedule execution of the job by the machine;
   determining whether a first dimension value for a job dimension for the job is different than a second dimension value for a machine dimension for the machine;
   upon determining that the first and second dimension values are different:
      identifying a plurality of config jobs to set the second dimension value for the machine dimension to be the same as the first dimension value for the job dimension, at least one of the plurality of config jobs being executable to modify, add or remove a component of an operating system of the machine, the plurality of config jobs comprising a first config job and a second config job, a config job dependency providing that the first config job is to execute prior to the second config job; and
      creating a run comprising the plurality of config jobs on the machine, the run defining a sequence in which the first config job is executed prior to the second config job to equip the machine to execute the job, wherein creating the run of the config jobs on the machine includes:
         selecting config jobs that delete machine dimensions not required by the job;
         selecting config jobs that set dimensions in the machine required by the job; and
         scheduling the selected config jobs to run on the machine;
   upon determining that the first and second dimension values are the same, scheduling execution of the job by the machine;
   wherein each machine dimension specifies an attribute of, or component provided by, an operating system of the machine, and each job dimension specifies an attribute of, or component provided by, an operating system of a machine equipped to execute the job.

2. The at least one computer readable storage medium of claim 1, further comprising storing information concerning the machine and groupings of config jobs on one or more computer-readable media for use in configuring one or more machine dimensions.

3. The at least one computer readable storage medium of claim 2, further comprising storing information concerning the machine and groupings of config jobs in a central storage.

4. The at least one computer readable storage medium of claim 3, further comprising updating the central storage with any change in the machine or in one of the config jobs.

5. The at least one computer readable storage medium of claim 1, wherein identifying one or more config jobs to set the machine dimensions to be the same as the job dimensions includes:
   identifying differences between job dimensions and machine dimensions; and
   identifying one or more config jobs to make up the differences.

6. The at least one computer readable storage medium of claim 5, wherein identifying one or more config jobs to make up the differences further includes resolving a conflict caused by a constraint of a config job.

7. A computing system for automatically preparing one or more machines to run an automated computing job ("job"), comprising:
   (a) a plurality of machines, each of which has associated therewith one or more machine dimensions, each machine dimension having a dimension value, each machine dimension specifying an attribute of, or component provided by, an operating system of a corresponding machine;
   (b) a plurality of config jobs that can configure a machine to meet one or more job dimensions, each job dimension having a dimension value, each job dimension specifying an attribute of, or component provided by, an operating system of a machine equipped to execute a corresponding job, and wherein each job dimension is an explicit dimension which indicates that a job will be executed on a machine having the dimension only if the job explicitly requires the dimension;
   (c) a central storage containing information concerning the machines and the config jobs; and
   (d) a smart scheduler component, coupled with the machines, the config jobs, and the central storage, for scheduling execution of a job by a machine, the smart scheduler component being operative to:
      (i) determine whether a first dimension value for a job dimension for the job is different than a second dimension value for a machine dimension for the machine;
      (ii) upon determining that the first and second dimension values are different:
         identify a subset of the plurality of config jobs to equip the machine to run the job, each of the subset being executable to modify, add or remove a hardware component of an operating system of the machine, the subset comprising a first config job and a second config job, a config job dependency providing that the first config job is to execute prior to the second config job;
         create a run comprising at least the first and second config jobs on the machine, the run defining a sequence in which the first config job is to be executed prior to the second config job to the machine to run the job, wherein creating the run of the config jobs on the machine includes:
            selecting config jobs that delete machine dimensions not required by the job;
            selecting config jobs that set dimensions in the machine required by the job; and
            scheduling the selected config jobs to run on the machine;

schedule for execution on the machine at least a portion of the run to configure the machine such that the second dimension value is the same as the first dimension value; and (iii) upon determining that the first and second dimension values are the same, scheduling execution of the job by the machine.

8. The computing system of claim 7, wherein the smart scheduler first identifies one or more suitable machines among the plurality of machines to run the job.

9. The computing system of claim 8, wherein a suitable machine requires the fewest number of config jobs to prepare the suitable machine to run the job.

10. The computing system of claim 7, wherein the job requires a number of machines to run, the smart scheduler
identifies and prepares the number of machines to run the job; and
reports a failure if the smart scheduler fails to find the numbers of machines.

11. The computing system of claim 7, wherein identifying one or more config jobs to prepare a machine to run the job includes:
identifying differences between dimensions of the job and dimensions of the machine; and identifying one or more config jobs to make up the difference.

12. The computing system of claim 11, wherein identifying one or more config jobs to make up the differences further includes resolving a conflict caused by a constraint of a config job.

13. The computing system of claim 7, wherein the central storage reflects any change in the configuration of a machine or in a config job.

14. At least one non-transitory computer-readable medium having instructions encoded thereon which, when executed, perform a method of selecting one or more machines to execute an automated job having a plurality of job dimensions, each job dimension having associated therewith a job dimension value, wherein each job dimension is an explicit dimension which indicates that a job will be executed on a machine having the dimension only if the job explicitly requires the dimension, the method comprising acts of:

(a) accessing information stored in a central storage relating to a plurality of machines, the information for each of the plurality of machines comprising a plurality of machine dimensions, each machine dimension corresponding to one of the plurality of job dimensions and having associated therewith a machine dimension value, each machine dimension relating to an attribute of, or component provided by, an operating system of a machine;

(b) identifying, of the plurality of machines, the one machine having fewest machine dimensions for which the associated machine dimension value does not match the job dimension value for the corresponding job dimension;

(c) identifying a group of configuration tasks to configure the one machine to execute the job;

(d) accessing information on groups of configuration jobs to identify a group of configuration jobs, comprising a first configuration job and a second configuration job, to perform the group of configuration tasks identified in (c), the accessed information specifying that the first configuration job is to be executed prior to the second configuration job to configure the one machine to execute the automated job, wherein identifying the group of configuration jobs includes:
selecting configuration jobs that delete machine dimensions not required by the job;
selecting configuration jobs that set dimensions in the machine required by the job; and scheduling the selected configuration jobs to run on the one machine;

(e) executing the group of configuration jobs on the one machine, in a sequence in which the first configuration job is executed prior to the second configuration job, to configure the one machine to execute the automated job.

* * * * *